United States Patent
Wuilpart (10) Patent No.: US 7,373,027 B2
(45) Date of Patent: May 13, 2008

(54) METHOD FOR CHARACTERIZING AN OPTICAL FIBER LINK

(75) Inventor: Marc Wuilpart, Braine-L'Alleud (BE)

(73) Assignee: Faculte Polytechnique de Mons (BE)

( * ) Notice: Subject to any disclaimer, the term of this patent is extended or adjusted under 35 U.S.C. 154(b) by 0 days.

(21) Appl. No.: 10/577,605

(22) PCT Filed: Oct. 27, 2004

(86) PCT No.: PCT/BE2004/000154

§ 371 (c)(1),
(2), (4) Date: Mar. 2, 2007

(87) PCT Pub. No.: WO2005/041449

PCT Pub. Date: May 6, 2005

(65) Prior Publication Data

US 2007/0201786 A1 Aug. 30, 2007

Related U.S. Application Data

(60) Provisional application No. 60/514,625, filed on Oct. 27, 2003.

(30) Foreign Application Priority Data

Apr. 30, 2004 (EP) .................................. 04447107

(51) Int. Cl.
*G02B 6/00* (2006.01)
*G02N 21/00* (2006.01)
(52) U.S. Cl. ....................................... 385/11; 356/73.1
(58) Field of Classification Search .................... None
See application file for complete search history.

(56) References Cited

U.S. PATENT DOCUMENTS

| 6,118,523 | A | * | 9/2000 | Brener et al. ............... 356/73.1 |
| 6,229,599 | B1 | | 5/2001 | Galtarossa |
| 7,016,024 | B2 | * | 3/2006 | Bridge et al. ............... 356/73.1 |
| 2002/0186435 | A1 | * | 12/2002 | Shpantzer et al. ........... 359/136 |
| 2003/0174312 | A1 | | 9/2003 | Leblanc |
| 2007/0132985 | A1 | * | 6/2007 | Palmieri ..................... 356/73.1 |

OTHER PUBLICATIONS

Wuilpart et al., "Polarization Mode Dispersion Mapping in Optical Fibers with a Polarization-OTDR", *IEEE Photonics Technology Letters*, vol. 14, No. 12, Dec. 2002.
Written Opinion of the International Searching Authority for PCT/BE2004/000154, mailed Feb. 14, 2005 (5 pages).

* cited by examiner

*Primary Examiner*—Tina M. Wong
(74) *Attorney, Agent, or Firm*—Knobbe Martens Olson & Bear LLP (57) ABSTRACT

A method for characterizing an optical link by its beat length, coupling length and polarization mode dispersion is disclosed. A pulsed signal is sent along said optical fiber link and the backscattered signal (being a POTDR signal) is measured after passing through a polarizer. The length of said optical fiber, the average power difference between two successive minima of said backscattered signal and the number of maxima per unit length are derived. In an iterative way a beat length interval and an interval for the polarization mode coupling parameter are determined until the length of said intervals is below a predetermined value, yielding a value for the beat length and the coupling length, and the polarization mode dispersion is calculated.

18 Claims, 7 Drawing Sheets

METHOD FOR CHARACTERIZING AN OPTICAL FIBER LINK

RELATED APPLICATIONS

This is a national phase application under 35 U.S.C. § 371 of WO 2005/041449 A1, filed as PCT/BE2004/000154 on Oct. 27, 2004, which is hereby incorporated by reference. This application claims the benefit of the filing date of U.S. Provisional Patent Application No. 60/514,625, filed Oct. 27, 2003, which is hereby incorporated by reference.

FIELD OF THE INVENTION

The present invention is related to a method for characterizing an optical fiber link by analysis of a Rayleigh backscatter signal, from which the spatial distribution of the beat length, the coupling length and the PMD (Polarization Mode Dispersion) along the link can be determined.

STATE OF THE ART

The use of dispersion-shifted and dispersion compensating fibers has minimised the effect of chromatic dispersion on the bandwidth of an optical link. Polarization mode dispersion (PMD) has therefore become the most serious limiting factor in high-speed optical communication systems. There exist several measurement techniques of PMD, but they only allow for measuring the global value and do not give information about the distribution of PMD along the fiber length. Measuring the spatial distribution of PMD is, however, important. Such a measurement would indeed allow to locate the bad trunks in an optical link, causing high PMD value. This can be essential in the frame of a network maintenance and upgrade.

The PMD of a fiber depends on two parameters: the beat length ($L_B$) and the coupling length ($L_C$). The beat length depends on the birefringence of the fiber and the coupling length is related to the phenomenon of polarization mode coupling. Measuring the spatial distribution of PMD therefore involves measuring the distribution of both the beat and coupling lengths.

Most of the techniques proposed for measurement of the distributed PMD are based on polarization-optical time domain reflectometry (POTDR). The concept of POTDR was introduced by A. Rogers in the 80's (see A. Rogers, '*Polarization-optical time domain reflectometry: a technique for the measurement of field distributions*', Applied Optics, vol. 20, pp. 1060-1074, 1981). It basically involves measuring the polarization properties of the Rayleigh backscatter signal when an optical pulse propagates down the fiber. Some POTDR-based techniques have since been developed for PMD characterization. Most of them allow a measurement of the beat length distribution along an optical link and, therefore, do not allow the complete determination of the PMD. However, Sunnerud presented a POTDR-based set-up enabling the measurement of the accumulation of PMD along the fiber (see H. Sunnerud et al., '*Polarization-Mode Dispersion measurements along installed optical fibers using gated backscattered light and a polarimeter*', J. of Lightwave Technol., vol. 18, pp. 897-904, 2000). This method requires POTDR measurements at several wavelengths. A technique based on the measurement of the degree of polarization by using a POTDR set-up has also been presented in '*Distributed detection of high-PMD sections on installed fibers using a polarization-OTDR*'. M. Leblanc, Proc. OFMC'01, pp. 155-162, 2001, and is related to the patent application US 2003/0174312. This technique does not allow quantification of the PMD, but enables to obtain distributed information about the level of PMD. Moreover this technique requires the complete measurement of the state of polarization of the backscattered signal. More recently, Galtarossa described another technique for the PMD measurement for which the coupling length is determined from the correlation of the birefringence vector (see '*Measurement of birefringence correlation length in long, single-mode fibers*', Galtarossa et al., Opt. Lett., vol. 26, pp. 962-964, 2001), which also requires the measurement of the polarization states of the backscattered signal. Moreover, this technique requires a quite small duration of the pulses launched in the optical fiber: 5-10 ns.

In '*Polarization mode dispersion mapping in optical fibres with a Polarization-OTDR*', M. Wuilpart, G. Ravet, P. Mégret and M. Blondel, Photon. Technol. Lett., vol. 14, pp. 1716-1718, 2002, the authors describe an analysis of the POTDR signal which allows a mapping of the PMD along an optical fiber link by quantifying the PMD on each fiber of the link. The main advantage of that technique is that it does not require the complete measurement of the backscattered polarization state evolution and only uses a linear polarizer at the fiber input, which is quite simple to implement. The determination of the beat length, the coupling length and finally the PMD is based on the analysis of the statistical properties of the extrema present in a POTDR trace.

Figure 1:
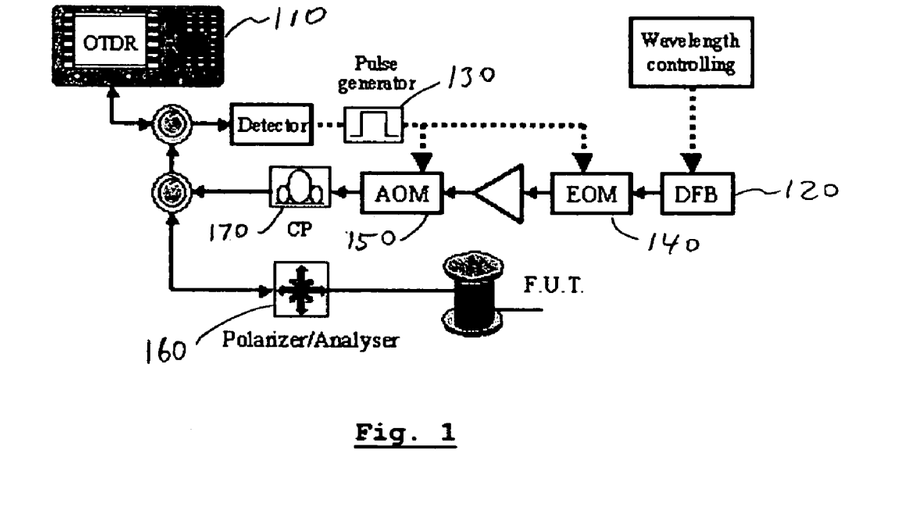
FIG. 1 is a block diagram of an example set-up for measuring a POTDR trace.

In said paper by Wuilpart et al. the spatial distribution of the linear birefringence δ is characterized by a Rayleigh statistical distribution along the fiber length and it is assumed that the rate of change of the birefringence angle q is described by a Gaussian distribution with zero mean and standard deviation σ depending on the polarization mode coupling strength. The circular birefringence is neglected. The corresponding measurement set-up is shown in FIG. 1. The OTDR 110 pulses (10 ns) externally modulate a 1553 nm distributed feedback (DFB) laser 120 via a pulse generator 130 and an electro-optic modulator (EOM) 140. After amplification, the pulses are launched into the fiber through an acousto-optic modulator (AOM) 150, which suppresses the amplified spontaneous emission noise of the erbium doped fiber amplifier between two successive pulses. A linear polarizer 160 is placed at the fiber input and a polarization controller (CP) 170 is used to obtain the maximum power after the polarizer.

Figure 2:
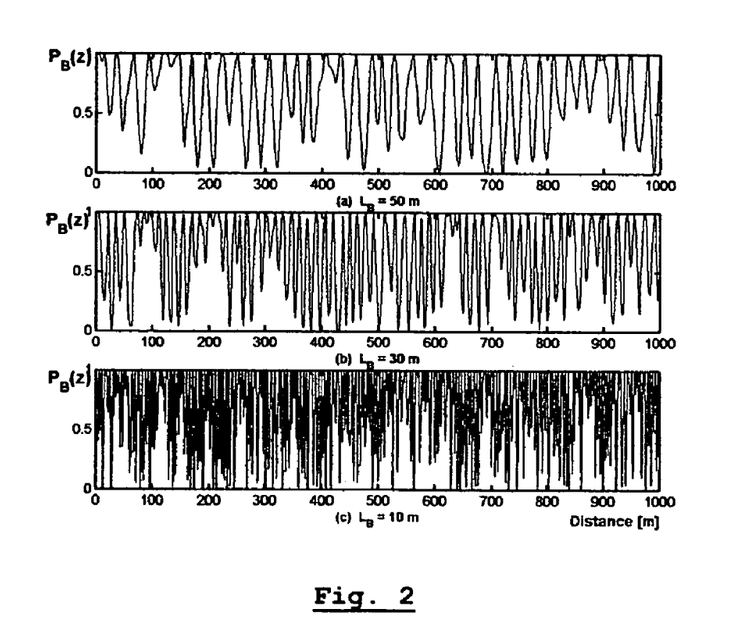
FIG. 2 is a diagram of three simulated POTDR traces for a given σ and for different $L_B$ values.

FIG. 2 shows three simulated POTDR traces corresponding to the POTDR arrangement and obtained for different values of the beat length and an identical σ value. One can easily observe that the number of maxima strongly depends on $L_B$.

Figure 3:
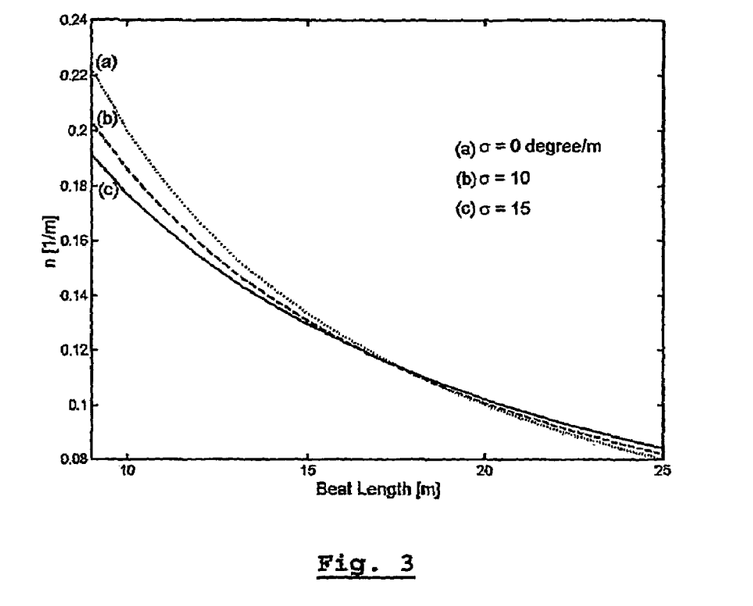
FIG. 3 is a diagram of the number of maxima per unit length versus $L_B$ for different values of σ.

The calculation of the beat length is based on the measurement of the number of maxima of the POTDR trace. FIG. 3, which has been obtained by simulation, presents the number n of maxima per unit of length in function of the beat length for different values of σ. This figure shows that n varies not only with $L_B$ but also with the strength of the polarization mode coupling (σ). In order to estimate $L_B$ from n, the curve corresponding to σ=10 (the dashed curve in FIG. 3) is used. This choice indeed minimises the maximum possible error if one assumes that σ is smaller than 15 degrees/m. Consequently, this method allows only to give an approximate value of the beat length $L_B$. A relationship between the coupling length $L_C$ and σ can be derived and one can obtain:

$$L_C = \frac{0.879}{\sigma^2}$$

Figure 4:
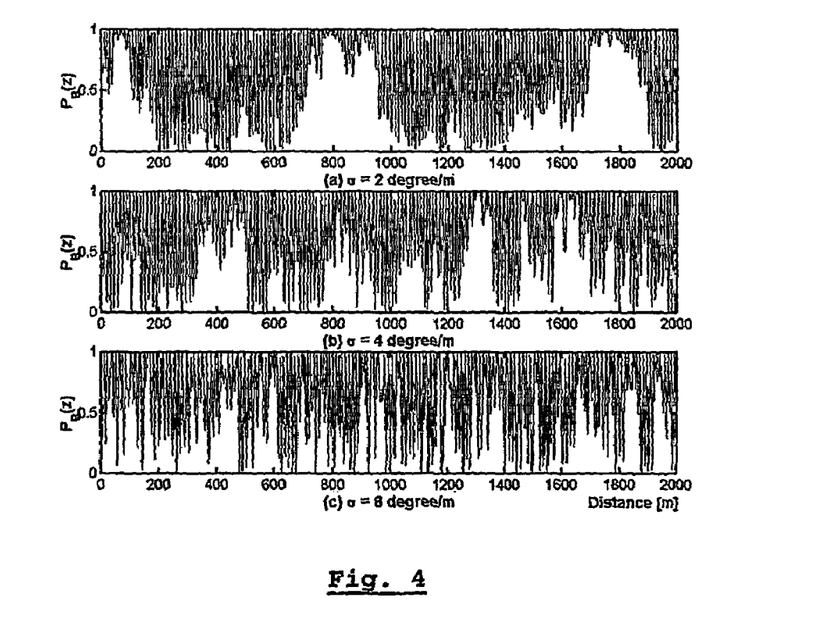
FIG. 4 is a diagram of simulated traces for a given beat length and different values of σ.

A statistical approach is then used for determining the coupling length from the POTDR trace. FIG. 4 shows different POTDR traces that were obtained by simulation for a beat length of 25 m and for different values of σ: 2, 4 and 8 degrees/m, respectively. One can observe that the lower envelope of the curves varies in a smoother way when σ decreases and therefore when $L_C$ increases. Defining $\Delta P_i$ as the absolute value of the difference in ordinate between two successive minima of the POTDR trace P one can write:

$$\Delta P_i = |P(z_i) - P(z_{i+1})|$$

where $z_i$ and $z_{i+1}$ correspond to the distances of the $i^{th}$ and the $i+1^{th}$ minimum, respectively.

Figure 5:
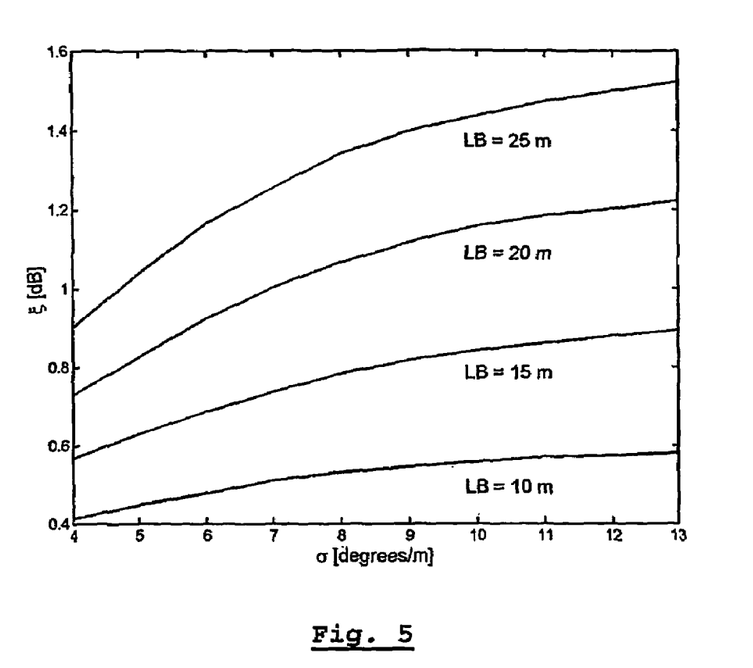
FIG. 5 is a diagram of the evolution of ξ as a function of σ for different values of $L_B$.

A new parameter ξ can then be calculated as $$\xi = \langle \Delta P_i \rangle_i$$

where $\langle . \rangle_i$ denotes the mean value for i varying from 1 to the number of minima of the POTDR trace. ξ is a measure of the speed variation of the lower envelope of the backscattered signal along the fiber length. FIG. 5 (obtained by simulation) shows the evolution of ξ according to σ for different values of the beat length $L_B$. The values are here expressed in dB because ξ has been calculated directly from the POTDR trace.

The procedure for the determination of $L_C$ is the following. From the POTDR trace, the number of maxima and each $\Delta P_i$ are measured. An approximate value of the beat length is then deduced by the method previously described and ξ is calculated by averaging $\Delta P_i$. Finally σ can be deduced from ξ by using the curve of FIG. 5 corresponding to the correct beat length and then $L_C$ is calculated by means of the relation $L_C = 0.879/\sigma^2$ stated above. Because $L_B$ is an approximate value, the calculated coupling length $L_C$ will also be an approximation.

From the measurement of the beat length and the coupling length, it is easy to determine an approximate value of the PMD value by $$PMD^2 = \frac{1}{2}\left(\frac{\lambda}{cL_B}\right)^2 L_C^2 \left(\frac{2L}{L_C} - 1 + e^{-\frac{2L}{L_C}}\right)$$

where c is the light velocity in a vacuum, λ the measurement wavelength and L the fiber length. It should be emphasised that the final PMD value is approximate: this is due to the approximation done on the beat length measurement. This process can be repeated for each contribution in the POTDR signal corresponding to the different fibers of the optical link: it is therefore possible to map the PMD along this link.

The method as described above has some important drawbacks and limitations. It only yields approximate values of $L_B$, $L_C$ and the PMD. Further, the presented POTDR traces were assumed ideal. It supposes ideal characteristics of the various components of the experimental set-up. In practice, the set-up is characterized by some imperfections, which cause a distortion of the ideal POTDR signal. Therefore the method as such cannot be directly applied. The POTDR signal is also affected by noise: detector noise and residual coherence noise, which adds a series of minima and maxima to the POTDR trace. The final value of the measured PMD can therefore be erroneous.

SUMMARY OF CERTAIN EMBODIMENTS

Certain embodiments provide a method for analysing a backscatter signal for determining in an accurate way the spatial distribution of the beat length, the coupling length and the polarization mode dispersion.

Certain embodiments relate to a method of characterizing an optical fiber link by its beat length, coupling length and polarization mode dispersion distribution comprising
sending a pulsed signal along the optical fiber link and measuring the backscattered signal (preferably a POTDR signal), after passing through a polarizer,
deriving the length of the optical fiber, the average power difference between two successive minima of the backscattered signal and the number of maxima per unit length,
in an iterative way determining a beat length interval and an interval for the polarization mode coupling parameter, until the length of the intervals is below a predetermined value, yielding a value for the beat length and the coupling length, and
calculating the polarization mode dispersion.

Preferably the POTDR signal is an ideal POTDR signal.
Advantageously the POTDR signal is the convolution of an ideal POTDR signal and a signal depending on the pulse shape. In an alternative embodiment, the POTDR signal further is convoluted with a signal taking into account the time jitter introduced by the measurement set-up.

In a specific embodiment a smoothing algorithm is applied to the POTDR signal.

Another embodiment relates to a method for characterizing an optical link comprising a concatenation of several fibers, wherein the method as previously described is applied to each fiber.

Another embodiment relates to the use of a method as described above to locate the position of polarization mode dispersion sources within an optical fiber link.

In an advantageous embodiment, the method as described is used in telecommunication networks. Alternatively, it can be applied in fiber sensing applications.

DETAILED DESCRIPTION OF CERTAIN EMBODIMENTS

It is first shown how the polarization mode dispersion from a POTDR signal can be determined in an accurate way ($L_B$ is not approximately determined anymore) by analysing the statistical properties of its extrema. Suppose first that σ falls within the range [0, 15] degrees/m, which means that the coupling length is assumed to be larger than 12.8 m. This σ interval has been chosen such that it corresponds to the values measured on real fibers.

From a POTDR signal, the fiber length L, ξ and the number of maxima per unit of length, $n_m$, are easily measurable. After measuring $n_m$, it is possible to determine a first interval $$[L^1_{B_{low}}, L^1_{B_{up}}]$$

for the beat length of the fiber under test so that:

$$L_B \in [L^1_{B_{low}}, L^1_{B_{up}}]$$

Figure 6:
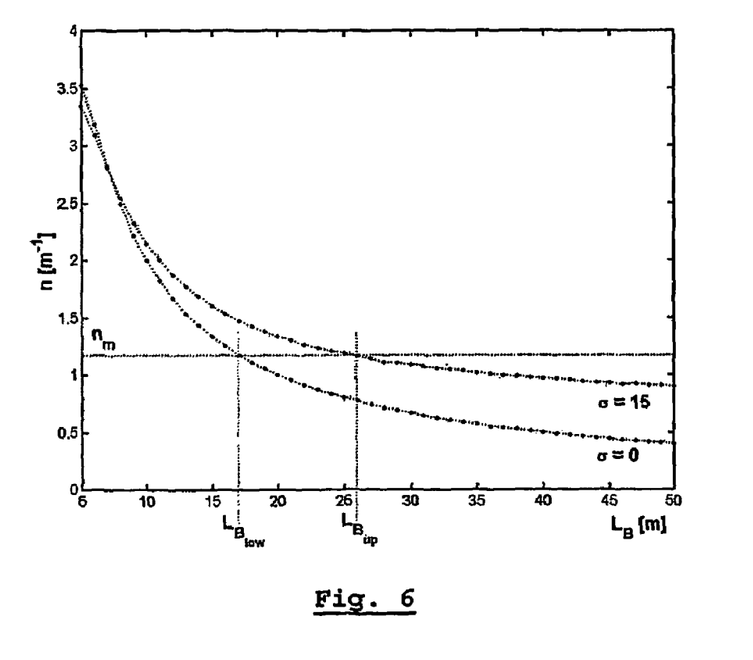
FIG. 6 is a diagram of the determination of the beat length interval.

$L^1_{B_{low}}$ and $L^1_{B_{up}}$ are determined by the intersections of the curves $n(L_B, \sigma)$ corresponding to σ=0 and σ=15 degrees/m with the straight line $n=n_m$ as shown on FIG. 6.

When the first beat length interval is determined, the curves $\xi(\sigma, L_B)$ can be used to define an interval $$[\sigma^1_{low}, \sigma^1_{up}]$$

for the σ value of the fiber under test so that:

$$\sigma \in [\sigma^1_{low}, \sigma^1_{up}]$$

Figure 7:
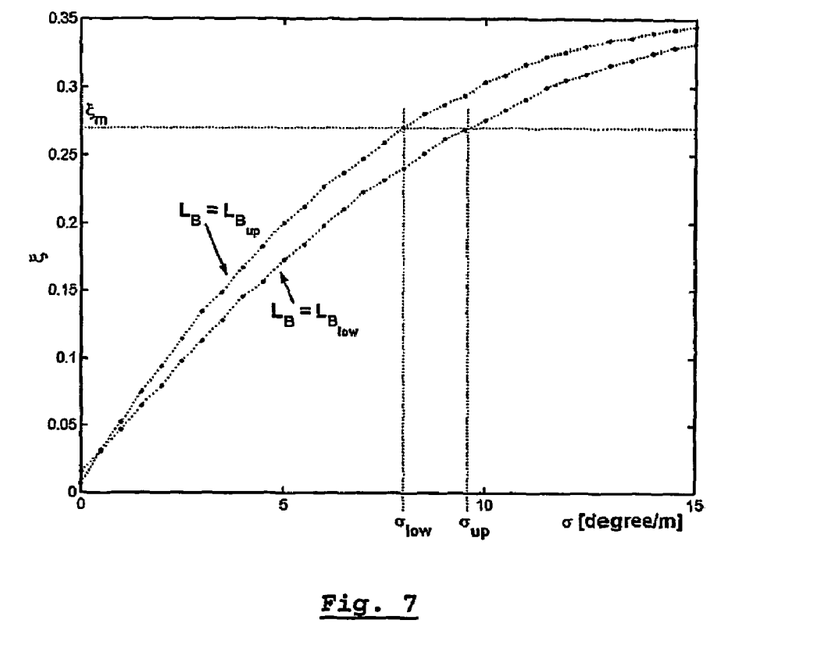
FIG. 7 is a diagram of the determination of the interval for σ.

$\sigma^1_{low}$ and $\sigma^1_{up}$ are determined by the intersections of the curves $\xi(\sigma, L_B)$ for $L_B=L^1_{B_{low}}$ and $L_B=L^1_{B_{up}}$ with the straight line $\xi=\xi_m$, where $\xi_m$ is the ξ value of the fiber under test measured from the POTDR signal. This principle is illustrated in FIG. 7.

After the determination of $\sigma^1_{low}$ and $\sigma^1_{up}$, the curves $n(L_B, \sigma)$ for $\sigma=\sigma^1_{low}$ and $\sigma=\sigma^1_{up}$ can be calculated. A new beat length interval is then deduced as previously explained by FIG. 6, but using the curves obtained for $\sigma=\sigma^1_{low}$ and $\sigma=\sigma^1_{up}$ instead of σ=0 and σ=15 degrees/m.

This new beat length interval denoted $$[L^2_{B_{low}}, L^2_{B_{up}}]$$

is included in $$[L^1_{B_{low}}, L^1_{B_{up}}]$$

and gives a smaller range for the beat length of the fiber under test. FIG. 7 is then used again to calculate a new σ interval $$[\sigma^2_{low}, \sigma^2_{up}]$$

by using the curves $\xi(\sigma, L_B)$ obtained for $$L_B=L^2_{B_{low}} \text{ and } L_B=L^2_{B_{up}}$$

This new interval gives a smaller range for the σ value of the fiber under test. This process is repeated until small enough intervals are obtained for the beat length $L_B$ and for σ.

When the beat length $L_B$ and σ are determined, the PMD is finally calculated by means of the relationship:

$$PMD = \sqrt{\frac{8}{3\pi}} \sqrt{\frac{1.545}{\pi} \left( \frac{\lambda}{L_B \ \sigma^2 \ c} \right)^2 \left( \frac{\sigma^2 L}{0.439} - 1 + e^{-\frac{\sigma^2 L}{0.439}} \right)}$$

If the optical link to be characterized comprises a concatentation of several fibers, the method is applied to each fiber of the link and their beat and coupling lengths are therefore determined independently of each other. In this way, the PMD mapping is possible along the link.

The method for analysing the backscatter signal as described offers several advantages:

- it requires only the access to one end of the optical fiber link to be characterized;
- it is based on a POTDR arrangement, but does not require the complete measurement of the complete state of polarization of the backscattered signal. Only a simple polarizer is required;
- it involves a POTDR measurement at only one wavelength;
- it gives accurate (not approximate) values for the beat length, the coupling length and the PMD.

In practice, the final measured signal is also affected by noise. This noise is due to the detector noise and to the presence of a residual coherence noise. As the determination of the PMD is based on the detection of extrema, it is obvious that this noise will affect the results.

As already mentioned before, the measured signal is also affected by the imperfections of the experimental set-up like the finite pulse shape and the time jitter of the electronic equipment.

These phenomena (noise and imperfections of the measurement set-up) lead to a distortion of the POTDR signal. Therefore it cannot be used directly to deduce the PMD map.

The width of the optical pulses launched into the fiber under test is finite and can be non-rectangular. Consequently, the backscattered power measured at the POTDR corresponds to an average of the ideal signal over a small spatial window depending on the pulse shape. The resulting signal measured at the POTDR is in fact the convolution product between the ideal signal and the shape of the pulse:

$$P_{pulse}(z) = P(z) P_{shape}(z)$$

where $P_{pulse}(z)$ is the power measured by the POTDR according to a certain pulse shape. $P(z)$ is the ideal POTDR signal and $P_{shape}(z)$ is the power distribution along the pulse. Hence the Fourier transform of $P_{pulse}(z)$ becomes:

$$P_{pulse}(k) = P(k) P_{shape}(k)$$

where $P_{pulse}(k)$, $P(k)$ and $P_{shape}(k)$ are the Fourier transforms of $P_{pulse}(z)$, $P(z)$ and $P_{shape}(z)$, respectively.

Moreover the electronic equipment is not perfect: it is subject to a time jitter, e.g., the time delay between two successive pulses is not constant. This phenomenon strongly affects the averaging process of the POTDR. If we suppose that the number of pulses involved in the averaging process of the OTDR is large enough and that the time jitter is a random variable characterized by a Gaussian distribution of zero mean and standard deviation $\sigma_{tj}$, the signal detected at the POTDR can be written as:

$$P_m(z) = P_{pulse}(z) \otimes e^{\frac{z^2}{2\sigma_{tj}^2}}$$

where $P_m(z)$ is the power measured by the POTDR taking into account the pulse shape and the time jitter. Hence the Fourier transform of $P_m(z)$ becomes:

$$P_m(z) = P_{pulse}(k) \sigma_{tj} e^{\frac{k^2 \sigma_{tj}^2}{2}}$$

Figure 8:
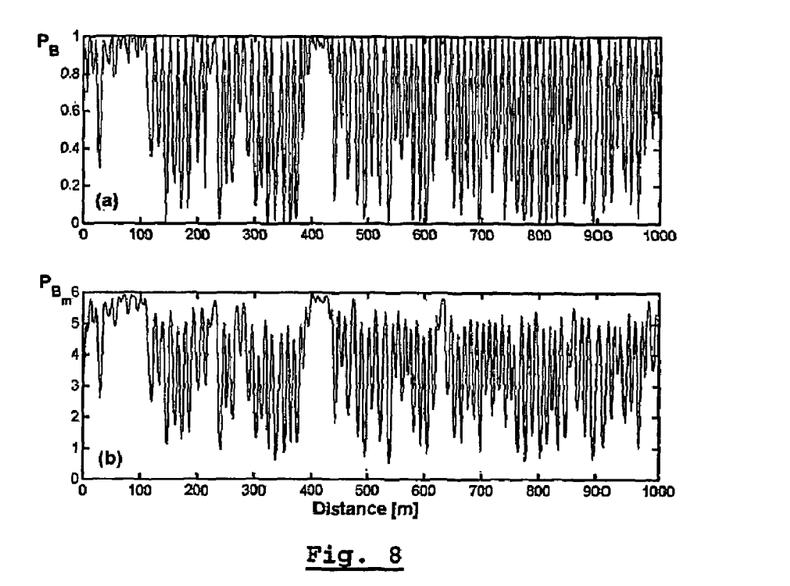
FIG. 8 is a diagram of the distortion of the POTDR signal due to the imperfections of the set-up (pulse shape+time jitter).

The pulse shape and the time jitter have for effect to distort the measured backscattered signal. An example is shown on FIG. 8, which has been obtained for parameters of the experimental set-up. The signals (a) and (b) correspond to the ideal and affected signals, respectively. One can clearly observe that the signal is strongly distorted.

Figure 9:
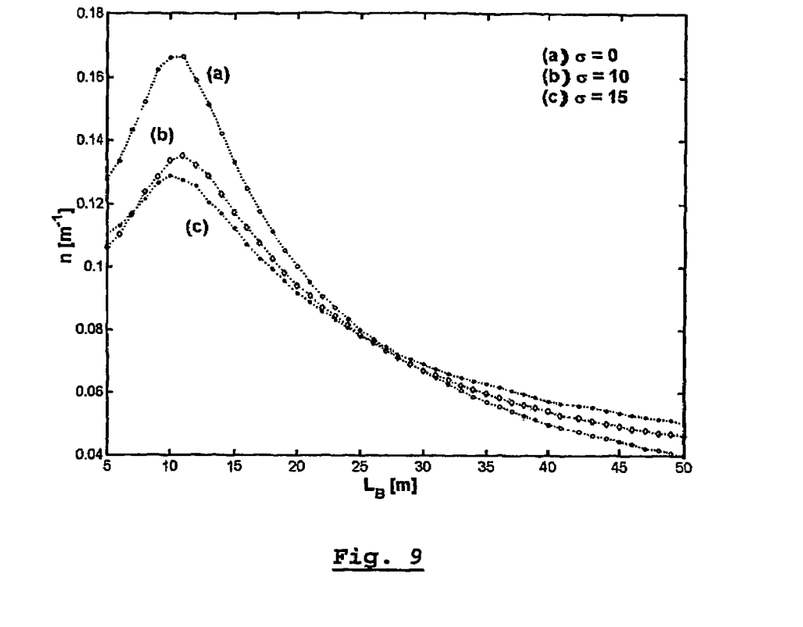
FIG. 9 is a diagram of the evolution of n with the beat length when the imperfections of the set-up are taken into account.
Figure 10:
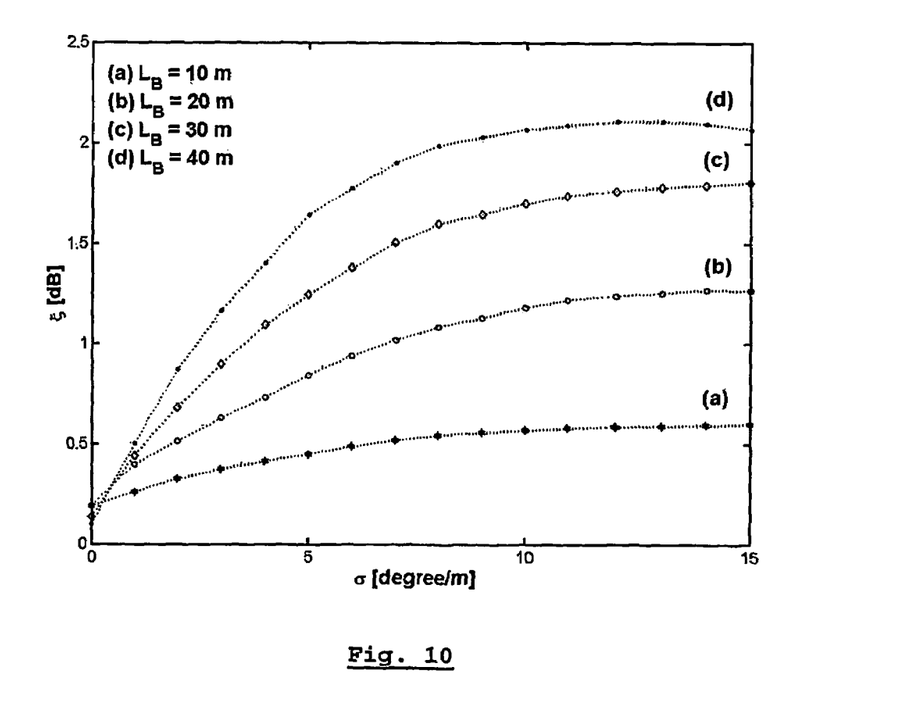
FIG. 10 is a diagram of the evolution of ξ with σ when the imperfections of the set-up are taken into account.

Because of these imperfections, the method described above cannot be used directly: the curves $n(L_B, \sigma)$ and $\xi(\sigma, L_B)$ are indeed based on ideal POTDR signals obtained by simulations. Therefore the effects of the pulse shape and the time jitter should be included in the calculation of $n(L_B, \sigma)$ and $\xi(\sigma, L_B)$. In the case of the parameters of the experimental set-up and a pulse duration of 10 ns, these new curves are shown on FIG. 9 and 10. In order to deduce these curves, ideal POTDR traces have been simulated and the effects of the imperfections have been taken into account by using the above expressions for $P_{pulse}(z)$ and $P_m(z)$. Consequently, when the imperfections of the experimental set-up are taken into account, the PMD map of an optical link can still be determined. The same reasoning as the one explained previously has to be applied on the POTDR signal by using the new set of curves $n(L_B, \sigma)$ and $\xi(\sigma, L_B)$ described in FIGS. 9 and 10. As the pulse shape is now taken into account, it is possible to launch a larger pulse in the fiber (50 ns, for example), which will increase the system dynamics. The maximum measurable length will therefore be greater.

As already indicated, the final measured signal is also affected by noise. This noise is due to the detector noise and the presence of a residual coherence noise. Its main effect is to add a series of minima and maxima to the POTDR trace. The values of n and $\xi$ cannot thus be correctly measured and the final calculated PMD will be erroneous. In order to solve this problem, a smoothing algorithm is applied to the back-scattered POTDR signal $P_m(z)$. This algorithm comprises generating the signal $P_s(z)$ such that:

$$P_s(z) = \frac{1}{L_s} \int_{z-\frac{L_s}{2}}^{z+\frac{L_s}{2}} P_m(z') dz'$$

$P_s(z)$ is therefore the mean value of $P_m(z)$ on a distance interval $L_s$ around z. The number of maxima and the distances $z_k$ corresponding to the locations of the minima of the POTDR trace are then calculated from the smoothed signal in order to ignore the influence of the small peaks generated by the noise. Afterwards, when the positions $z_k$ are known, $\xi$ is calculated from $P_m(z)$. When noise is present, the number of extrema of $P_s(z)$ depends of the smoothing parameter $L_s$. So, the main problem is to choose the correct smoothing parameter to be applied to the POTDR signal.

Figure 11:
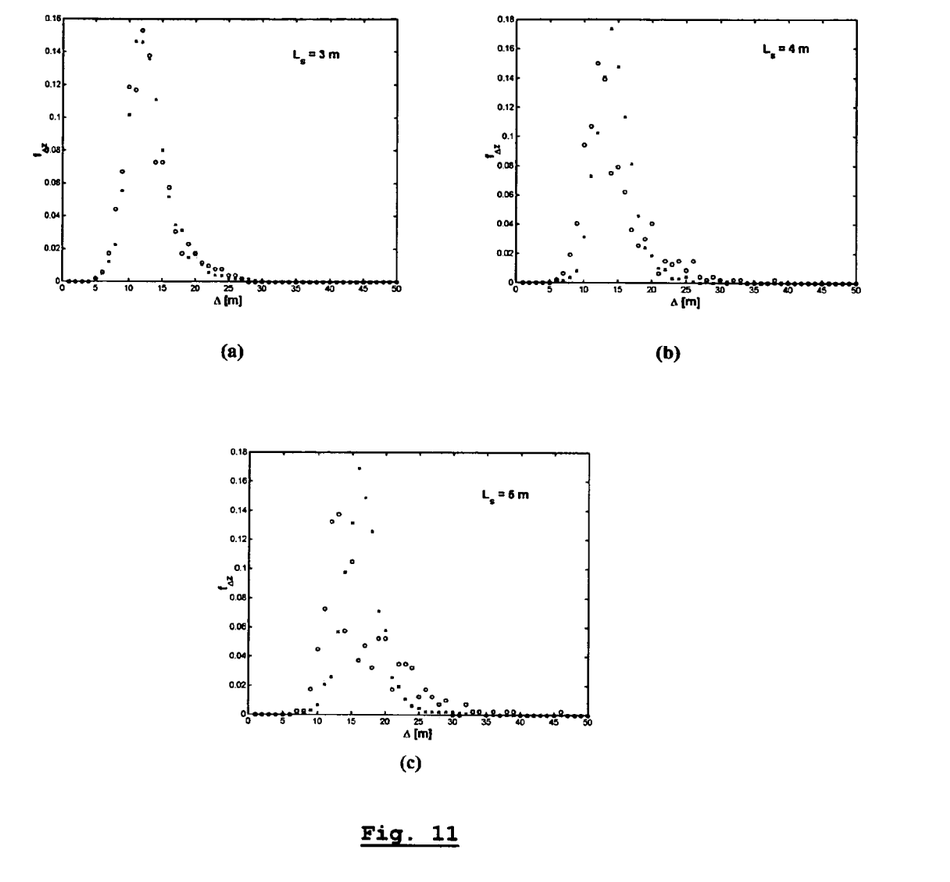
FIG. 11 is a diagram of the simulated and measured probability density function of Δ.

The location of the minima of the smoothed signal can be used to estimate the probability density function of $\Delta$, denoting the difference in z between two successive minima. This estimation can then be compared to the density probability function of $\Delta$ of a POTDR trace obtained by means of simulations taking into account the parameters $L_B$ and $\sigma$ calculated from the smoothed signal. If the probability density functions of $\Delta$ obtained from $P_s(z)$ and from the simulation do not match, it means that the noise contribution is significant. The smoothing parameter $L_s$ will therefore be chosen such that the corresponding probability density function obtained from measurements can be correctly fitted by the probability density function derived from simulations: $L_s$ is therefore chosen such that the noise contribution is reduced. FIG. 11 illustrates this concept. FIGS. 11(*a*), 11(*b*) and 11(*c*) show the probability density functions obtained by measurement (circles) and by simulation (crosses) for a given optical fiber and for an $L_s$ value of 3, 4 and 5 m, respectively. One can clearly observe in this case $L_s$=3 m gives the best fitting.

Certain embodiments provide a technique which allows to locate more accurately the position of the PMD source within the fiber. The basic idea involves applying the described method on a distance window (1 km, for example), which slides along the fiber length. By comparing the obtained PMD's on several successive windows as shown on FIG. 12, it is possible to locate more accurately high PMD sources within the optical fiber.

POTDR can also be used in fiber sensing. The polarization properties indeed depend on several external effects like strain, temperature, electric and magnetic fields. Strain, twist, temperature, electric and magnetic fields affect the birefringence within the fiber and consequently, the mean beat length. Certain embodiments, which measure the spatial distribution of the beat length, therefore allow to measure the spatial distribution of these external effects after calibrating the sensing fiber.

What is claimed is:

1. A method of characterizing an optical fiber link by its beat length, coupling length and polarization mode dispersion distribution, comprising:

sending a pulsed signal along said optical fiber link and measuring the backscattered signal, after passing through a polarizer, deriving the length of said optical fiber, the average power difference between two successive minima of said backscattered signal and the number of maxima per unit length, in an iterative way determining a beat length interval and an interval for the polarization mode coupling parameter, until the length of said intervals is below a predetermined value, yielding a value for the beat length and the coupling length, calculating the polarization mode dispersion.

2. The method as in claim 1, wherein said backscattered signal is a polarization-optical time domain reflectometry (POTDR) signal.

3. The method as in claim 2, wherein said POTDR signal is an ideal POTDR signal.

4. The method as in claim 2, wherein said POTDR signal is the convolution of an ideal POTDR signal and a signal depending on the pulse shape.

5. The method as in claim 4, wherein said POTDR signal further is convoluted with a signal taking into account the effect of time jitter.

6. The method as in claim 2, wherein a smoothing algorithm is applied to said POTDR signal.

7. A method of characterizing an optical link comprising a concatenation of several fibers, comprising determining for each fiber of said link a beat length, coupling length and polarization mode dispersion distribution, wherein said determining comprises:

sending a pulsed signal along the fiber in said optical fiber link and measuring the backscattered signal, after passing through a polarizer, deriving the length of said optical fiber, the average power difference between two successive minima of said backscattered signal and the number of maxima per unit length, in an iterative way determining a beat length interval and an interval for the polarization mode coupling parameter, until the length of said intervals is below a predetermined value, yielding a value for the beat length and the coupling length, and calculating the polarization mode dispersion.

8. The method as in claim 7, wherein said backscattered signal is a polarization-optical time domain reflectometry (POTDR) signal.

9. The method as in claim 8, wherein said POTDR signal is an ideal POTDR signal.

10. The method as in claim 8, wherein said POTDR signal is the convolution of an ideal POTDR signal and a signal depending on the pulse shape.

11. The method as in claim 10, wherein said POTDR signal further is convoluted with a signal taking into account the effect of time jitter.

12. The method as in claim 8, wherein a smoothing algorithm is applied to said POTDR signal.

13. A method of locating the position of polarization mode dispersion sources within an optical fiber link by characterizing said optical fiber link by its beat length, coupling length and polarization mode dispersion distribution, wherein said characterizing comprises:

sending a pulsed signal along said optical fiber link and measuring the backscattered signal, after passing through a polarizer, deriving the length of said optical fiber, the average power difference between two successive minima of said backscattered signal and the number of maxima per unit length, in an iterative way determining a beat length interval and an interval for the polarization mode coupling parameter, until the length of said intervals is below a predetermined value, yielding a value for the beat length and the coupling length, calculating the polarization mode dispersion.

14. The method as in claim 1, wherein said optical fiber link is a telecommunication network optical fiber link.

15. The method as in claim 7, wherein said optical fiber link is a telecommunication network optical fiber link.

16. The method as in claim 13, wherein said optical fiber link is a telecommunication network optical fiber link.

17. A method of characterizing an optical fiber link in a fiber sensing application by its beat length, coupling length and polarization mode dispersion distribution, comprising:

sending a pulsed signal along said optical fiber link and measuring the backscattered signal, after passing through a polarizer, deriving the length of said optical fiber, the average power difference between two successive minima of said backscattered signal and the number of maxima per unit length, in an iterative way determining a beat length interval and an interval for the polarization mode coupling parameter, until the length of said intervals is below a predetermined value, yielding a value for the beat length and the coupling length, calculating the polarization mode dispersion.

18. A method of locating the position of polarization mode dispersion sources within an optical fiber link in a fiber sensing application by characterizing said optical fiber link by its beat length, coupling length and polarization mode dispersion distribution, wherein said characterizing comprises:

sending a pulsed signal along said optical fiber link and measuring the backscattered signal, after passing through a polarizer, deriving the length of said optical fiber, the average power difference between two successive minima of said backscattered signal and the number of maxima per unit length, in an iterative way determining a beat length interval and an interval for the polarization mode coupling parameter, until the length of said intervals is below a predetermined value, yielding a value for the beat length and the coupling length, calculating the polarization mode dispersion.

* * * * *

UNITED STATES PATENT AND TRADEMARK OFFICE
CERTIFICATE OF CORRECTION

Figure 12:
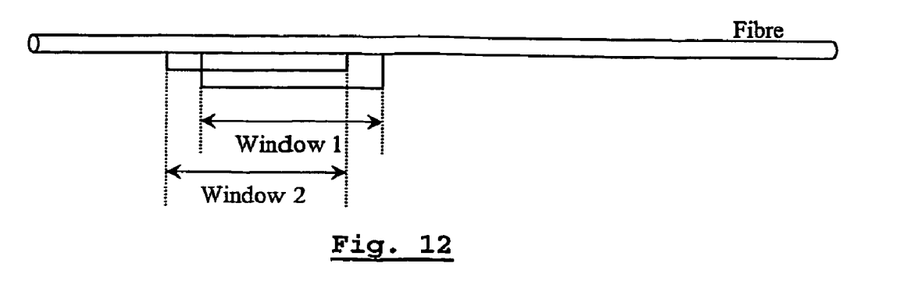
FIG. 12 is a diagram representing the window algorithm that can be used for calculated the local PMD.

PATENT NO.       : 7,373,027 B2                              Page 1 of 2
APPLICATION NO.  : 10/577605
DATED            : May 13, 2008
INVENTOR(S)      : Marc Wuilpart It is certified that error appears in the above-identified patent and that said Letters Patent is hereby corrected as shown below:

In Figure 12, Line 1, please delete "Fibre" and insert -- Fiber --, therefor.

Fig. 12

In Col. 2, Line 17 (approx.), please delete "fibres" and insert -- fibers --, therefor.

In Col. 6, Line 32-33 (approx.), please delete "concatentation" and insert -- concatenation --, therefor.

In Col. 7, Line 5 (approx.), please delete " $P_{pulse}(z)=P(z)P_{shape}(z)$ " and insert -- $P_{pulse}(z) = P(z) \otimes P_{shape}(z)$ --, therefor.

In Col. 7, Line 25 (approx.), please delete " $\frac{z^2}{2\sigma_{ij}}$ " and insert -- $-\frac{z^2}{2\sigma_{ij}}$ --, therefor.

In Col. 7, Line 35 (approx.), please delete " $\frac{k^2 \sigma_{ij}^2}{2}$ " and insert -- $-\frac{k^2 \sigma_{ij}^2}{2}$ --, therefor.

UNITED STATES PATENT AND TRADEMARK OFFICE
CERTIFICATE OF CORRECTION

PATENT NO. : 7,373,027 B2
APPLICATION NO. : 10/577605
DATED : May 13, 2008
INVENTOR(S) : Marc Wuilpart It is certified that error appears in the above-identified patent and that said Letters Patent is hereby corrected as shown below:

In Col. 7, Line 35 (approx.), please delete "$P_m(z)$" and insert -- $p_m(k)$ --, therefor.

Signed and Sealed this

Twenty-ninth Day of December, 2009

David J. Kappos
*Director of the United States Patent and Trademark Office*